(12) United States Patent
Chen et al.

(10) Patent No.: US 12,034,340 B2
(45) Date of Patent: Jul. 9, 2024

(54) MOTOR EXTERNAL ROTOR, BRUSHLESS PERMANENT MAGNET MOTOR AND ELECTRICAL PRODUCT

(71) Applicant: Nidec Motor (Qingdao) Corporation, Shandong Province (CN)

(72) Inventors: Zhaoming Chen, Shandong Province (CN); Bing Guo, Shandong Province (CN); Jianqiang Ma, Shandong Province (CN); Hengdong Cui, Shandong Province (CN); Bingfu Jiao, Shandong Province (CN)

(73) Assignee: Nidec Motor (Qingdao) Corporation, Shandong Province (CN)

( * ) Notice: Subject to any disclaimer, the term of this patent is extended or adjusted under 35 U.S.C. 154(b) by 462 days.

(21) Appl. No.: 17/424,447

(22) PCT Filed: Dec. 16, 2020

(86) PCT No.: PCT/CN2020/136751
§ 371 (c)(1),
(2) Date: Jul. 20, 2021

(87) PCT Pub. No.: WO2021/258676
PCT Pub. Date: Dec. 30, 2021

(65) Prior Publication Data
US 2022/0302780 A1 Sep. 22, 2022

(30) Foreign Application Priority Data
Jun. 23, 2020 (CN) .......................... 202010579476.0

(51) Int. Cl.
*H02K 1/2786* (2022.01)
*H02K 1/28* (2006.01)
*H02K 15/02* (2006.01)

(52) U.S. Cl.
CPC ............. *H02K 1/2786* (2013.01); *H02K 1/28* (2013.01); *H02K 15/02* (2013.01)

(58) Field of Classification Search
CPC ................................ H02K 1/2786; H02K 1/28
See application file for complete search history.

(56) References Cited

U.S. PATENT DOCUMENTS 6,460,382 B1 * 10/2002 Kim ..................... D06F 37/304
  68/140
8,022,583 B2 * 9/2011 Zhang .................... H02K 29/03
  310/179

(Continued)

FOREIGN PATENT DOCUMENTS

| CN | 102163899 | 8/2011 |
| CN | 202039215 | 11/2011 |

(Continued)

OTHER PUBLICATIONS

International Search Authority, "International Search Report," issue in connection with PCT Application No. PCT/CN2020/136751, mailed Mar. 23, 2021, 5 pages.

(Continued)

*Primary Examiner* — Robert W Horn
(74) *Attorney, Agent, or Firm* — Hanley, Flight & Zimmerman, LLC

(57) ABSTRACT

The embodiments of the present disclosure provide a motor external rotor, a brushless permanent magnet motor and an electrical product, the motor external rotor including: a first inner cylinder portion, an outer cylinder portion located at a radial outer side of the first inner cylinder portion, and a connection portion radially connecting the first inner cylinder portion and the outer cylinder portion, the connection portion including: a plurality of first web sections extending from an axial side of an outer circumferential surface of the first inner cylinder portion in a direction away from the first (Continued)

inner cylinder portion; a plurality of second web sections extending from the other axial side of the outer circumferential surface of the first inner cylinder portion in a direction away from the first inner cylinder portion, and the plurality of second web sections and the plurality of first web sections being arranged circumferentially at intervals; and a plurality of axial connection sections extending from the outer circumferential surface of the first inner cylinder portion in a direction away from the first inner cylinder portion, and axially connecting the first web sections and the second web sections. The motor external rotor in the embodiments of the present disclosure has a simple structure and high strength and rigidity, air gaps of the motor external rotor are uniform, and running noise of the motor is reduced.

27 Claims, 10 Drawing Sheets

(56) References Cited

U.S. PATENT DOCUMENTS

| | | | | |
|---|---|---|---|---|
| 8,030,808 | B2 * | 10/2011 | Zhang | H02K 1/2791 |
| | | | | 310/43 |
| 8,344,568 | B2 * | 1/2013 | Bailey | H02K 7/003 |
| | | | | 310/156.26 |
| 8,395,293 | B2 * | 3/2013 | Marchitto | H02K 1/2791 |
| | | | | 310/156.26 |
| 8,482,176 | B2 * | 7/2013 | Bailey | D06F 37/304 |
| | | | | 310/156.26 |
| 8,593,027 | B2 * | 11/2013 | Marchitto | H02K 1/28 |
| | | | | 310/156.19 |
| 8,716,912 | B2 * | 5/2014 | Bailey | D06F 37/304 |
| | | | | 310/90 |
| 11,670,977 | B2 * | 6/2023 | Fogle | H02K 9/06 |
| | | | | 310/47 |
| 2007/0132323 | A1 * | 6/2007 | Park | H02K 15/0012 |
| | | | | 310/43 |
| 2011/0175479 | A1 | 7/2011 | Marchitto et al. | |
| 2013/0082579 | A1 * | 4/2013 | Bailey | D06F 37/304 |
| | | | | 310/75 R |
| 2013/0270930 | A1 * | 10/2013 | Bailey | H02K 1/30 |
| | | | | 310/43 |
| 2014/0232214 | A1 * | 8/2014 | Bailey | D06F 37/304 |
| | | | | 310/43 |
| 2016/0315520 | A1 * | 10/2016 | Bailey | D06F 37/304 |
| 2018/0048212 | A1 * | 2/2018 | Bailey | D06F 37/304 |
| 2022/0302780 | A1 * | 9/2022 | Chen | H02K 1/2791 |

FOREIGN PATENT DOCUMENTS

| | | | | |
|---|---|---|---|---|
| CN | 202039215 U | * | 11/2011 | |
| CN | 207039351 | | 2/2018 | |
| CN | 207039351 U | * | 2/2018 | .......... D06F 37/304 |
| CN | 110676959 | | 1/2020 | |
| CN | 110676959 A | * | 1/2020 | |
| CN | 212162960 | | 12/2020 | |

OTHER PUBLICATIONS

International Searching Authority, "Written Opinion," issued in connection with International Patent Application No. PCT/CN2020/136751, dated Mar. 23, 2021, 9 pages. [English translation included].
International Searching Authority, "International Preliminary Report on Patentability," issued in connection with International Patent Application No. PCT/CN2020/136751, dated Dec. 13, 2022, 11 pages. [English translation included].

* cited by examiner

MOTOR EXTERNAL ROTOR, BRUSHLESS PERMANENT MAGNET MOTOR AND ELECTRICAL PRODUCT

CROSS REFERENCE TO RELATED APPLICATION

This patent arises from an application that is a 371 National Stage of International PCT Application No. PCT/CN2020/136751, filed on Dec. 16, 2020, and is hereby incorporated by reference in its entirety. Further, this patent claims priority to Chinese Patent Application 202010579476.0, which was filed on Jun. 23, 2020, which is hereby incorporated by reference in its entirety.

FIELD

The present disclosure relates to the field of motors and, in particular relates to a motor external rotor, a brushless permanent magnet motor and an electrical product.

BACKGROUND

Currently, the application of a brushless permanent magnet external rotor-typed motor in washing machines is becoming more and more popular, in particular such motor is widely applied in direct-drive washing machines, a radial size of an external rotor motor is becoming larger and larger, a size of an external rotor is becoming larger and larger too, a faster and faster spin-drying speed is also required for direct-drive washing machines, which has a higher and higher requirement on a rotor design of the external rotor motor.

Currently, two structural types are generally adopted for a permanent magnet external rotor:

One is adoption of sheet metal drawing forming, a magnetic steel is pasted to an inner cylinder surface of a sheet metal housing by an anaerobic adhesive or epoxy adhesive, a splined hub cooperating with a washing machine is integral with a rotor by adopting a method of assembling or injection molding, a rotor with such structural type has a complicated production process, the quality of bonding a magnetic steel is unstable, the production efficiency of a motor external rotor is low, and the product quality stability is poor.

The other one is injection molding, for example thermal plastic or thermosetting plastic is adopted for injection molding, in this method, a rotor magnetic conductive ring, a magnetic steel and a splined hub directly serve as inserts to form a whole rotor by a method of injection molding or compression molding, and by using this method, a product forming processing cycle is short and the production efficiency is high. However, a rotor by injection molding must be designed reasonably, so as to meet the use performance of the rotor, such that a rotor has good physical performance, mechanical performance and good structural process performance, a deformed warpage caused by rotor injection molding is reduced, thereby a product with high efficiency and high quality can be produced.

It should be noted that the above introduction to the technical background is just to facilitate a clear and complete description of the technical solutions of the present disclosure, and is elaborated to facilitate the understanding of persons skilled in the art. It cannot be considered that the above technical solutions are known by persons skilled in the art just because these solutions are elaborated in the BACKGROUND of the present disclosure.

SUMMARY OF THE INVENTION

The inventor finds that a rotor housing by means of sheet metal drawing forming has a complex process and poor product accuracy, and in order to ensure an inner surface of a magnetic steel and a splined hub to be concentric, the splined hub needs to be assembled by a method of injection molding, moreover, the environmental protection property and technological property of the magnetic steel are poor by adopting a method of glue pasting, and with an increase of a temperature and a rotational speed when a motor is running, the magnetic steel will have an exfoliation phenomenon, the stability of a rotor product is poor. A rotor by means of injection molding adopts a shape design of a radial reinforcement rib, an external rotor motor when running is easy to produce a resonance phenomenon with a washing machine drum, thereby causing big noise and vibration, and a mold structure is complex, a cavity is not easy to be manufactured. In addition, when adopting a method of thermosetting plastic injection or compression molding, the rotor production efficiency is low, a product scrap rate is high, thermosetting plastic cannot be recycled, and the environmental protection property is poor.

In order to solve at least one of said problems or other similar problems, the embodiments of the present disclosure provide a motor external rotor, a brushless permanent magnet motor including the motor external rotor, and an electrical product including the motor.

According to one aspect of the embodiments of the present disclosure, a motor external rotor is provided, including: a first inner cylinder portion, an outer cylinder portion located at a radial outer side of the first inner cylinder portion, and a connection portion radially connecting the first inner cylinder portion and the outer cylinder portion, the connection portion includes:

a plurality of first web sections extending from an axial side of an outer circumferential surface of the first inner cylinder portion in a direction away from the first inner cylinder portion;

a plurality of second web sections extending from the other axial side of the outer circumferential surface of the first inner cylinder portion in a direction away from the first inner cylinder portion, and the plurality of second web sections and the plurality of first web sections being arranged circumferentially at intervals; and a plurality of axial connection sections extending from the outer circumferential surface of the first inner cylinder portion in a direction away from the first inner cylinder portion, and axially connecting the first web sections and the second web sections.

According to another aspect of the embodiments of the present disclosure, a motor external rotor is provided, including: an inner cylinder portion, an outer cylinder portion located at a radial outer side of the inner cylinder portion, and a connection portion radially connecting the inner cylinder portion and the outer cylinder portion, the connection portion includes:

a plurality of web sections extending from an axial side of an outer circumferential surface of the inner cylinder portion in a direction away from the inner cylinder portion, the plurality of web sections being arranged circumferentially at intervals; and a plurality of axial extension sections extending axially at at least one side of a circumferential direction of each of the web sections.

According to further aspect of the embodiments of the present disclosure, a motor external rotor is provided, including: a first inner cylinder portion, an outer cylinder portion located at a radial outer side of the first inner cylinder portion, and a connection portion radially connecting the first inner cylinder portion and the outer cylinder portion, the connection portion includes:

a plurality of first web sections extending from an axial side of an outer circumferential surface of the first inner cylinder portion in a direction away from the first inner cylinder portion;

a plurality of second web sections extending from the other axial side of the outer circumferential surface of the first inner cylinder portion in a direction away from the first inner cylinder portion, and the plurality of second web sections and the plurality of first web sections being arranged circumferentially at intervals; and a plurality of axial connection sections axially connecting the first web sections and the second web sections, a radial length of each of the axial connection sections being less than a radial length of each of the first web sections and of each of the second web sections.

According to another aspect of the embodiments of the present disclosure, a brushless permanent magnet motor is provided, including:

the motor external rotor according to any of the preceding embodiments; and a stator, located at a radial inner side of the rotor and configured to be opposed to the rotor.

According to further aspect of the embodiments of the present disclosure, an electrical product is provided, including the above-mentioned brushless permanent magnet motor.

One of advantageous effects of the embodiments of the present disclosure is that: a rotor structure is simple, magnetic steel positioning distribution is reasonable, a strength and rigidity of a rotor are high, which improve an utilization rate of a material, effectively reduce an internal stress and a deformed warpage caused by rotor injection molding and improve product quality of the rotor; an air gap of a stator and a rotor of a motor is uniform, which effectively reduces running noise of the motor.

Referring to the later description and figures, specific implementations of the present disclosure are disclosed in detail, indicating a manner that the principle of the present disclosure can be adopted. It should be understood that the implementations of the present disclosure are not limited in terms of the scope. Within the scope of the terms of the appended claims, the implementations of the present disclosure include many changes, modifications and equivalents.

Features that are described and/or illustrated with respect to one implementation may be used in the same way or in a similar way in one or more other implementations and in combination with or instead of the features in the other implementations.

It should be emphasized that the term "comprise/include" when being used herein means the presence of a feature, a whole piece, a step or a component, but does not preclude the presence or addition of one or more other features, whole pieces, steps or components.

BRIEF DESCRIPTION OF THE DRAWINGS

An element and a feature described in a figure or an implementation of the present embodiments of the present disclosure can be combined with an element and a feature shown in one or more other figures or implementations. In addition, in the figures, similar numerals represent corresponding components in several figures, and can be used to indicate corresponding components used in more than one implementations.

The included figures are used to provide a further understanding on the embodiments of the present disclosure, constitute a part of the Description, are used to illustrate the implementations of the present disclosure, and expound together with the text description the principle of the present disclosure. Obviously, the figures in the following description are only some embodiments of the present disclosure. Persons skilled in the art can also obtain other figures based on the figures under the premise that they do not pay inventive labor. In the figures.

DETAILED DESCRIPTION

Referring to the figures, through the following Description, the above and other features of the embodiments of the present disclosure will become obvious. The following Description and figures specifically disclose particular implementations of the embodiments of the present disclosure, showing partial implementations which can adopt the principle of the embodiments of the present disclosure. It should be understood that the embodiments of the present disclosure are not limited to the described implementations, on the contrary, the embodiments of the present disclosure include all the modifications, variations and equivalents falling within the scope of the appended claims.

In the following description of the embodiments of the present disclosure, for ease of description, a direction parallel to a direction extending along a central axis of a rotor is referred to as "an axial direction", a radius direction taking the central axis as a center is referred to as "a radial direction", a direction around the central axis is referred to as "a circumferential direction", a side away from the central axis along the radius direction is referred to as "a radial outer side", a side close to the central axis along the radius direction is referred to as "a radial inner side", an axial side is referred to as "an axial upper side", the other axial side is referred to as "an axial lower side", but these are just for ease of description and do not define orientations of a rotor and a motor when they are used and manufactured.

Various implementations of the embodiments of the present disclosure will be described below with reference to the figures. These implementations are only exemplary and do not limit on the embodiments of the present disclosure.

Embodiments of the First Aspect

The embodiments of the present disclosure provide a motor external rotor.

Figure 1:
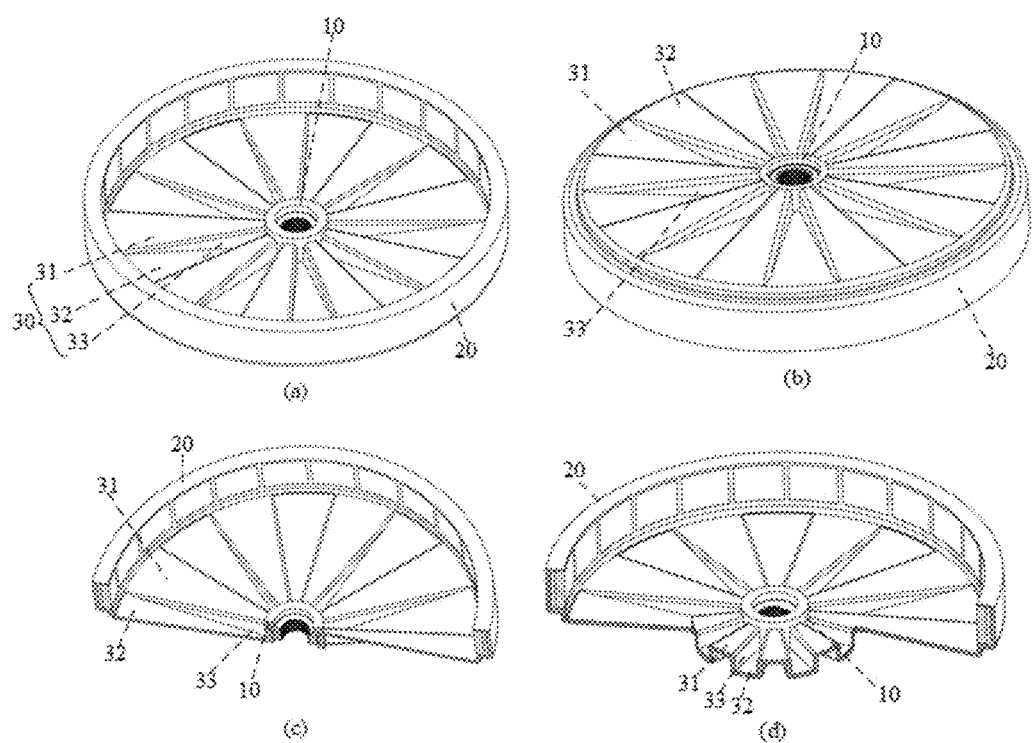
FIG. 1 is a schematic diagram of an example of a motor external rotor in the embodiments of the present disclosure.

FIG. 1 is a schematic diagram of an example of the motor external rotor in the embodiments of the present disclosure, (a), (b), (c) and (d) therein show different angles of the motor external rotor, for example (a) shows a condition of an axial side of the motor external rotor; (b) shows a condition of the other axial side of the motor external rotor; (c) shows a cross section of the motor external rotor; and (d) shows another cross section of the motor external rotor.

As shown in FIG. 1, in the embodiments of the present disclosure, the motor external rotor includes: a first inner cylinder portion 10, an outer cylinder portion 20 located at a radial outer side of the first inner cylinder portion 10, and a connection portion 30 radially connecting the first inner cylinder portion 10 and the outer cylinder portion 20.

In the embodiments of the present disclosure, as shown in FIG. 1, the connection portion 30 includes: a plurality of first web sections 31, a plurality of second web sections 32 and a plurality of axial connection sections 33. Each of the first web sections 31 extends from an axial side of an outer circumferential surface of the first inner cylinder portion 10 in a direction away from the first inner cylinder portion 10; each of the second web sections 32 extends from the other axial side of the outer circumferential surface of the first inner cylinder portion 10 in a direction away from the first inner cylinder portion 10, each of the axial connection sections 33 extends from the outer circumferential surface of the first inner cylinder portion 10 in a direction away from the first inner cylinder portion 10, and axially connects the first web sections 31 and the second web sections.

In the motor external rotor of the embodiments of the present disclosure, the connection portion 30 connecting the first inner cylinder portion 10 and the outer cylinder portion 20 forms a structure configured at concave and convex intervals in a circumferential direction, which increases heights of the rotor's webs at both internal and external sides and speeds up an air flow speed inside the motor, outside air flows into the inside of the motor via a stator winding gap, which takes away heat from a motor stator and effectively reduces temperature rise of the motor. And since there is no air leakage design between an axial connection section and a web section, the two can form a fan-like river diversion structure, such that the rotor during rotation can generate a radial air flow, thereby the temperature rise of the motor can be effectively reduced.

In the embodiments of the present disclosure, the first inner cylinder portion 10 may include a structure that mutually cooperates with a shaft of the motor, this structure can be called a spline or a splined hub, and for its specific structure, relevant technologies can be referred to, and the present disclosure does not make limitations thereon.

In the embodiments of the present disclosure, the outer cylinder portion 20 may include a part that interacts with a stator of the motor, for example the outer cylinder portion 20 may include a magnetic steel and a magnetic conductive ring, etc., and for a mode of combining the outer cylinder portion 20 with the magnetic steel and the magnetic conductive ring, the present disclosure does not make limitations thereon, relevant technologies can be referred to for details.

In the embodiments of the present disclosure, the first inner cylinder portion 10, the outer cylinder portion 20 and the connection portion 30 can be formed through a mode of metal stamping shaping, or can be formed through a mode of cast shaping, or can be formed through a mode of plastic molding shaping, or can be shaped by means of any combination of said modes, the present disclosure does not make limitations on shaping modes.

According to the embodiments of the present disclosure, the rotor of the embodiments of the present disclosure which is shaped by adopting said modes has a simple production process, high production efficiency and requires a smaller number of production equipment and required labor, occupies less space of a workshop, thus the production cost is low and the product quality is high.

Figure 2:
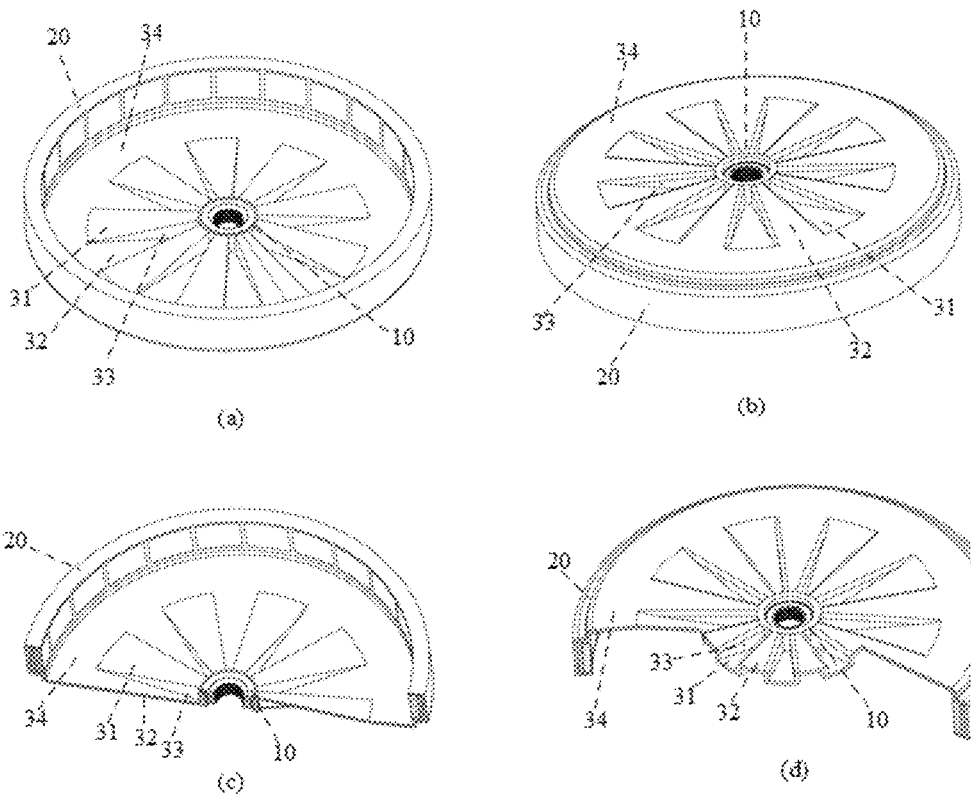
FIG. 2 is a schematic diagram of another example of the motor external rotor in the embodiments of the present disclosure.

FIG. 2 is a schematic diagram of another example of the motor external rotor in the embodiments of the present disclosure, (a), (b), (c) and (d) therein show different angles of the motor external rotor. Being different from the example of FIG. 1, in the example of FIG. 2, the connection portion 30 further includes an annular section 34 in addition to the first web section 31, the second web section 32 and the axial connection section 33. As shown in FIG. 2, the annular section 34 is located a side of a plurality of first web sections 31 and a plurality of second web sections 32 away from the first inner cylinder portion 10, and an end of an axial lower side of the outer cylinder portion 20 is connected to an edge of a radial outer side of the annular section 34.

That is, the annular section 34 is located between the outer cylinder portion 20 and web sections (the first web section 31 and the second web section 32), the web sections and the axial connection section 33 do not extend to the outer cylinder portion 20 but extend to the annular section 34. Namely, the annular section 34 is located a radial outer side of a radial outer end of the first web section 31, the second web section 32 and the axial connection section 33 to form an annular shape. In some embodiments, as shown in FIG. 2, there can be no height difference between the second web section 32 and the annular section 34, i.e., the two are in a same plane, thereby air flowing can be sped up, but the present disclosure is not limited to this.

By providing the annular section 34, a flow speed of air inside the motor can be further sped up, further playing a role of heat dissipation.

In the embodiments of the present disclosure, positions of a radial inner end of the first web section 31 and a radial inner end of the second web section 32 at an outer circumferential surface of the first inner cylinder portion 10 are not limited, FIG. 2 shows a situation in which the radial inner end of the first web section 31 is located at an axial upper side of the outer circumferential surface of the first inner cylinder portion 10, the radial inner end of the second web section 32 is located at an axial lower side of the outer circumferential surface of the first inner cylinder portion 10, or the radial inner end of the first web section 31 is located at a position close to an axial upper side of the outer circumferential surface of the first inner cylinder portion 10, the radial inner end of the second web section 32 is located at a position close to an axial lower side of the outer circumferential surface of the first inner cylinder portion 10, as long as the first web section 31 and the second web section 32 form a height difference at a radial inner side.

Figure 3:
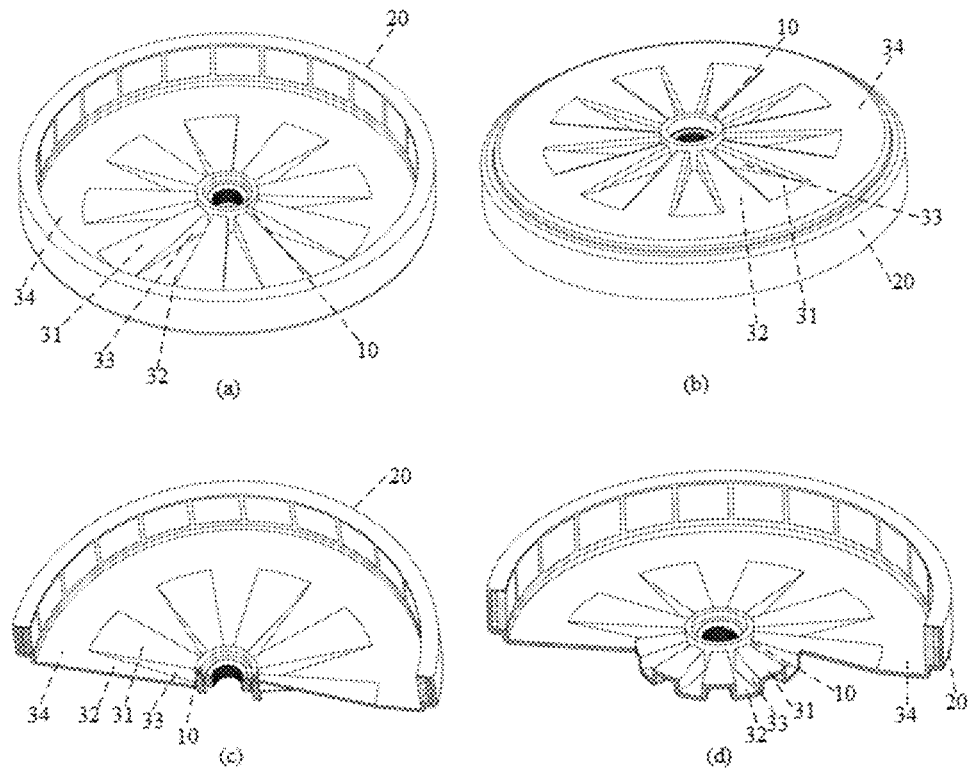
FIG. 3 is a schematic diagram of a further example of the motor external rotor in the embodiments of the present disclosure.

FIG. 3 is a schematic diagram of another example of the motor external rotor in the embodiments of the present disclosure, (a), (b), (c) and (d) therein show different angles of the motor external rotor. Being different from the example of FIG. 2, in the example of FIG. 3, the radial inner end of the first web section 31 is located at a position below the axial upper side of the outer circumferential surface of the first inner cylinder portion 10 (referring to (a) of FIG. 3), the radial inner end of the second web section 32 is located at a position above the axial lower side of the outer circumferential surface of the first inner cylinder portion 10 (referring to (b) of FIG. 3), thereby also enabling the connection portion 30 to circumferentially form a structure configured at concave and convex intervals.

Figure 4:
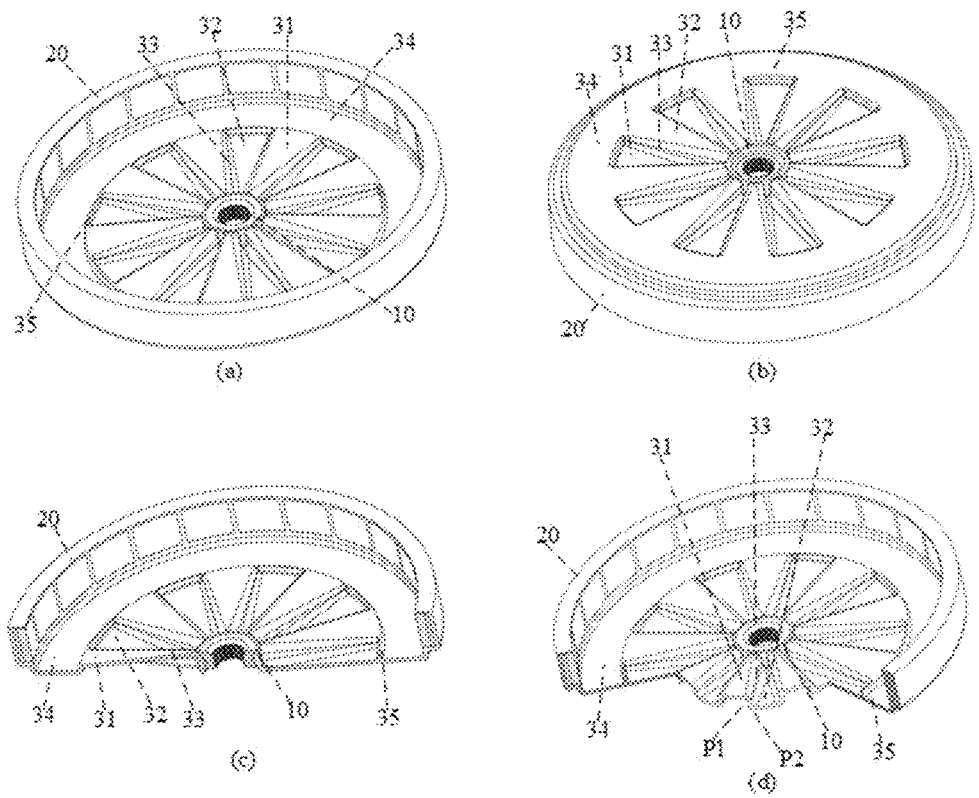
FIG. 4 is a schematic diagram of a more example of the motor external rotor in the embodiments of the present disclosure.

FIG. 4 is a schematic diagram of another example of the motor external rotor in the embodiments of the present disclosure, (a), (b), (c) and (d) therein show different angles of the motor external rotor. Being different from the example of FIG. 3, in the example of FIG. 4, the connection portion 30 further includes a cylindrical surface ring 35 in addition to the first web section 31, the second web section 32, the axial connection section 33 and the annular section 34.

As shown in FIG. 4, the cylindrical surface ring 35 is radially located between the annular section 34 and a plurality of second web sections 32, ends of a plurality of first web sections 31 away from a side of the first inner cylinder portion 10 (radial outer ends of the first web sections 31) and ends of the axial connection sections 33 away from the side of the first inner cylinder portion 10 (radial outer ends of the axial connection sections 33) are connected at an inner circumferential surface of the cylindrical surface ring 35. Namely, the cylindrical surface ring 35 is arranged around radial outer ends of the first web sections 31, the second web sections 33 and the axial connection sections 33, to form an annular shape with a certain height in an axial direction.

Through the design of the cylindrical surface ring 35, the first web sections 31 can be connected to the second web sections 32 at radial outer sides, which enhances a strength and rigidity of the rotor.

In some embodiments, as shown in FIG. 4, an axial height of the cylindrical surface ring 35 is less than an axial height of the first inner cylinder portion 10. In this way, the first web sections 31 have an axial height difference at the radial inner side and the radial outer side, which can further enhance the strength and rigidity of the rotor.

In some embodiments, as shown in (d) of FIG. 4, the position P1 where the axial connection section 33 is connected to the first web section 31 and the position P2 where the axial connection section 33 is connected to the second web section 32 are transitioned via an arc. Thereby, it helps air flowing.

Figure 5:
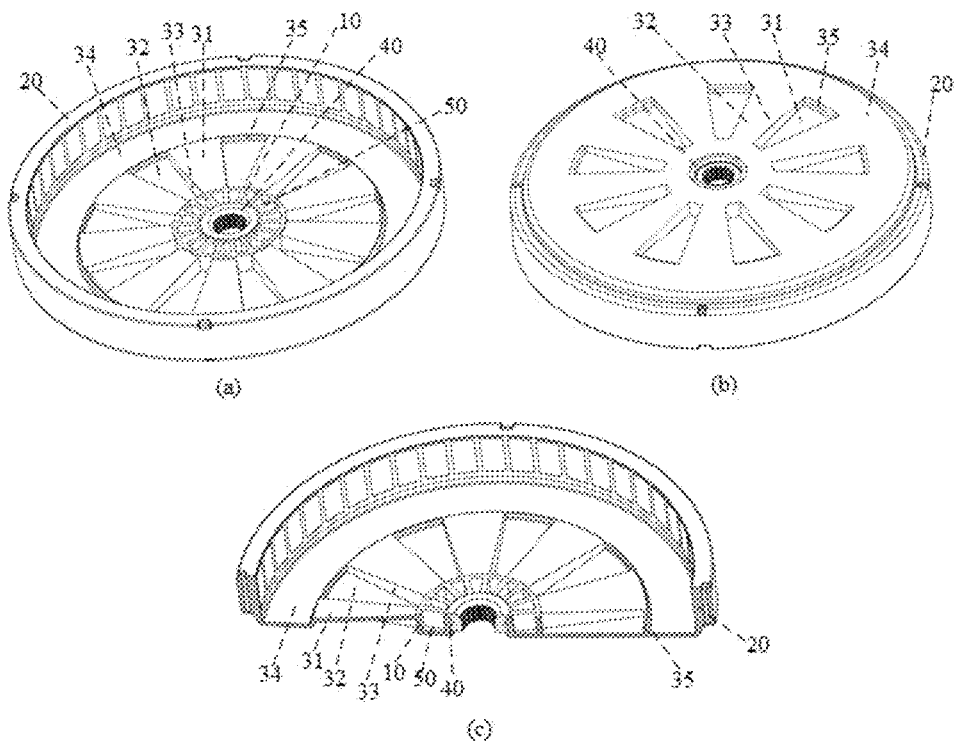
FIG. 5 is a schematic diagram of another example of the motor external rotor in the embodiments of the present disclosure.

FIG. 5 is a schematic diagram of another example of the motor external rotor in the embodiments of the present disclosure, (a), (b) and (c) therein show different angles of the motor external rotor. Being different from the example of FIG. 4, in the example of FIG. 5, the motor external rotor further includes a second inner cylinder portion 40 and a radial connection section 50.

As shown in FIG. 5, the second inner cylinder portion 40 is located at the radial inner side of the first inner cylinder portion 10, the radial connection section 50 radially connects the first inner cylinder portion 10 and the second inner cylinder portion 20, for example the radial connection section 50 includes a plurality of circumferentially arranged reinforcement ribs, each reinforcement rib extends from the inner circumferential surface of the first inner cylinder portion 10 in a direction away from the first inner cylinder portion 10 and extends to the outer circumferential surface of the second inner cylinder portion 40, thereby to form a radial connection section 50.

A strength of the rotor can be enhanced by forming the second inner cylinder portion 40 and the radial connection section 50.

Figure 6:
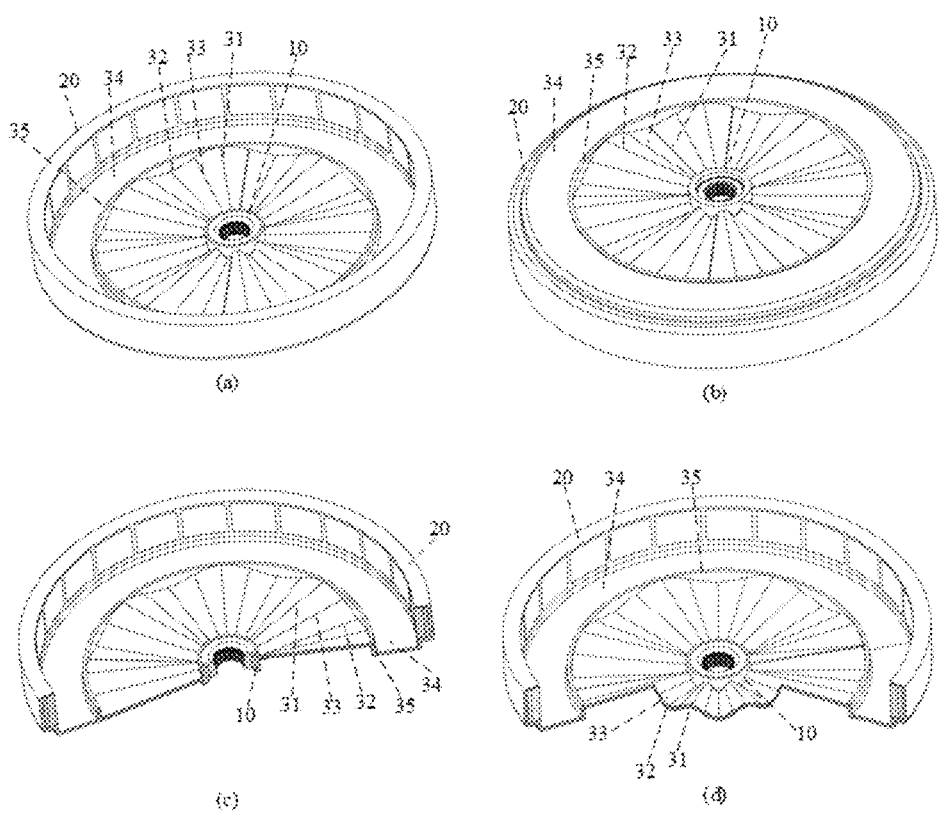
FIG. 6 is a schematic diagram of a further example of the motor external rotor in the embodiments of the present disclosure.

FIG. 6 is a schematic diagram of a further example of the motor external rotor in the embodiments of the present disclosure, (a), (b), (c) and (d) therein show different angles of the motor external rotor. As shown in FIG. 6, in some embodiments, the plurality of first web sections 31, the plurality of second web sections 32 and the plurality of axial connection sections 33 circumferentially form a wave shape. In this example, the second web section 32 and the annular section 34 are not in the same plane, and there is no obvious boundary among the first web section 31, the second web section 32 and the axial connection section 33 (referring to (d) of FIG. 6).

Through a design of forming the connection portion 30 to be in a wave shape, the webs connecting inner and outer cylinder portions can form a concave-convex distribution, which can also speed up air flowing.

Figure 7:
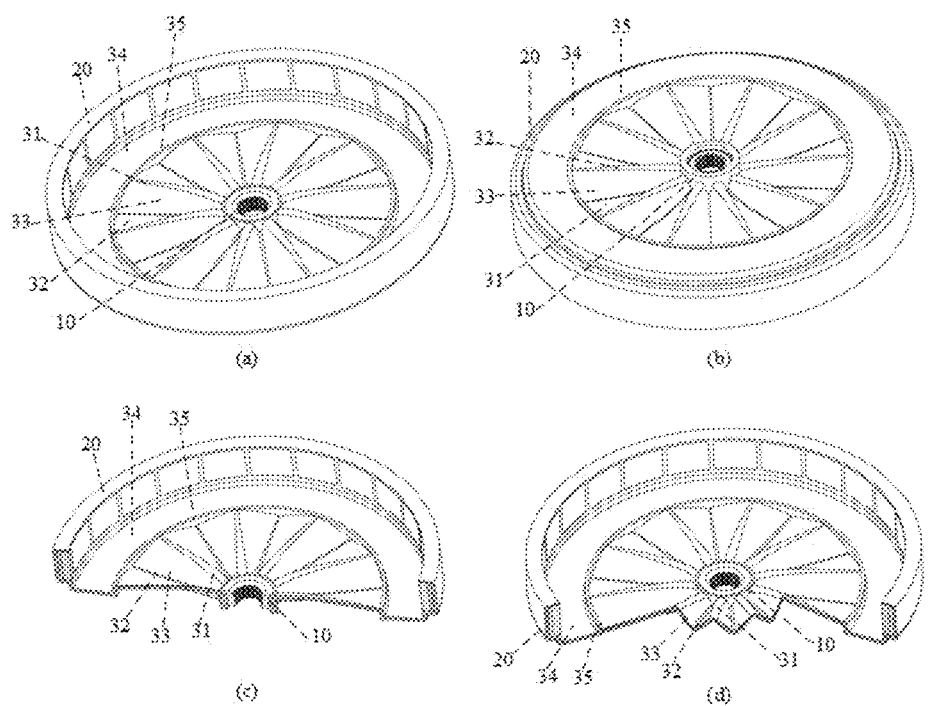
FIG. 7 is a schematic diagram of a more example of the motor external rotor in the embodiments of the present disclosure.

FIG. 7 is a schematic diagram of a more example of the motor external rotor in the embodiments of the present disclosure, (a), (b), (c) and (d) therein show different angles of the motor external rotor. Being different from the example of FIG. 6, in the example of FIG. 7, the plurality of first web sections 31, the plurality of second web sections 32 and the plurality of axial connection sections 33 circumferentially form a fold line shape. In this example, the second web section 32 and the annular section 34 are not in the same plane either, and there is no obvious boundary among the first web section 31, the second web section 32 and the axial connection section 33 (referring to (d) of FIG. 7).

Through a design of forming the connection portion 30 to be in a fold line shape, the webs connecting inner and outer cylinder portions can form a concave-convex distribution, which can also speed up air flowing.

Figure 8:
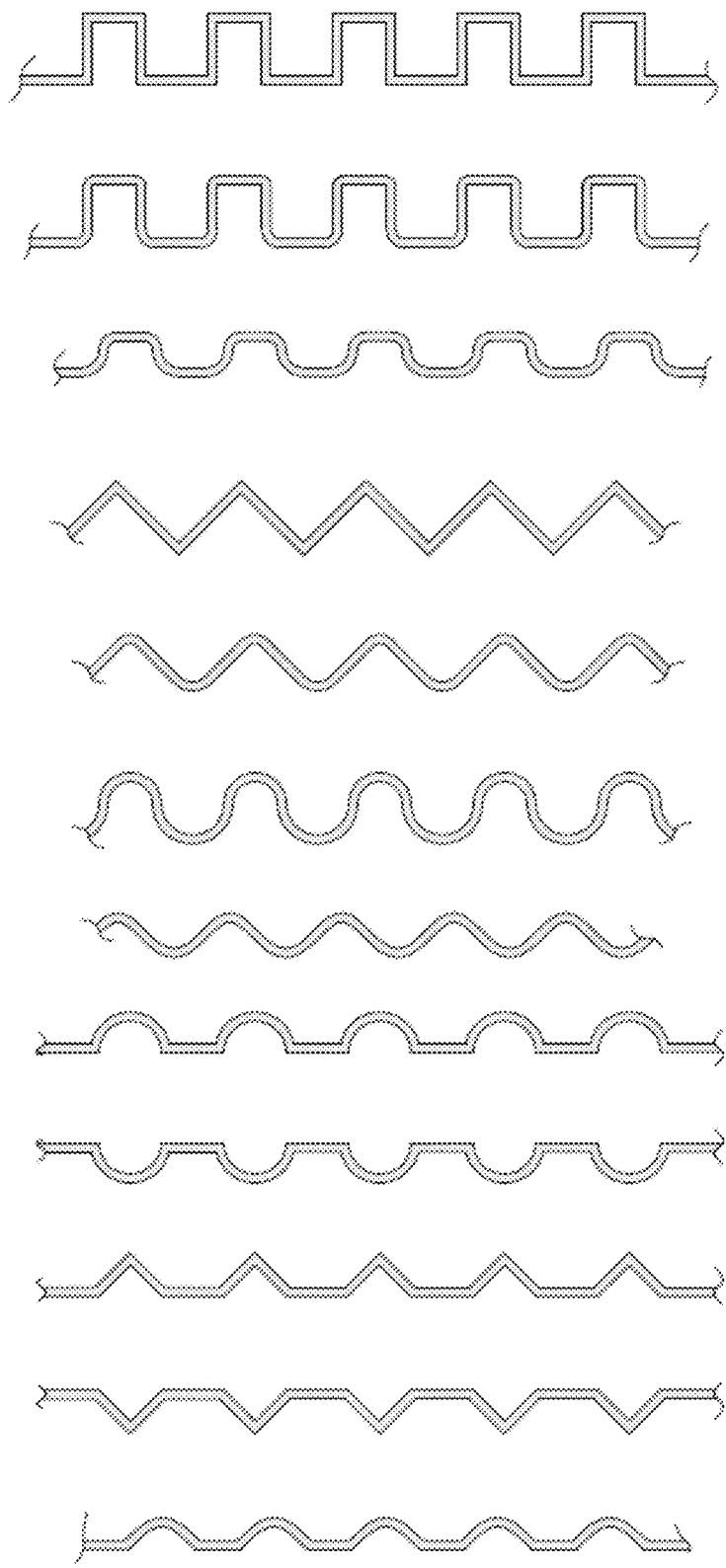
FIG. 8 is a schematic diagram of a concave-convex shape formed by a first web section, a second web section and an axial connection section in a circumferential direction.

The examples in FIG. 6 and FIG. 7 are only illustrative, in the embodiments of the present disclosure, the plurality of first web sections 31, the plurality of second web sections 32 and the plurality of axial connection sections 33 also can circumferentially form other shapes, FIG. 8 shows several possible shapes, but the present disclosure is not limited to these.

Figure 9:
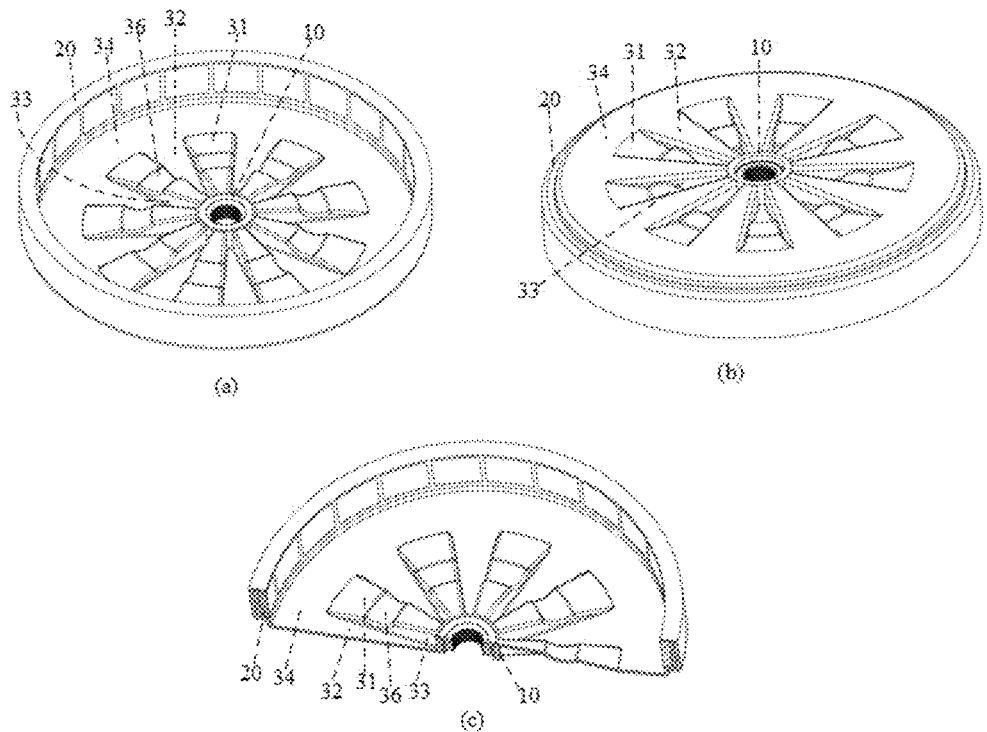
FIG. 9 is a schematic diagram of another example of the motor external rotor in the embodiments of the present disclosure.

FIG. 9 is a schematic diagram of a more example of a motor external rotor in the embodiments of the present disclosure, (a), (b) and (c) therein show different angles of the motor external rotor. Being different from the example of FIG. 2, in the example of FIG. 9, a recess 36 concaved toward the axial lower side is formed on the axial upper side of the first web section 31, a surface of the recess 36 is formed as a toroid.

Through a design of a concave curved surface, a strength and rigidity of the rotor are enhanced, and running noise of the motor is reduced.

In the embodiments of the present disclosure, a forming position and a quantity of the recess 36 are not limited, for example it can be formed at a roughly radial middle position of the first web section 31, or can be formed at a position of the first web section 31 close to a radial inner side or a position close to a radial outer side, the number of the recesses 36 formed on each first web section 31 may be one as shown in FIG. 9, or may be other quantity. A design of the recess 36 is optional, in other embodiments, the recess 36 may be also not provided.

Figure 10:
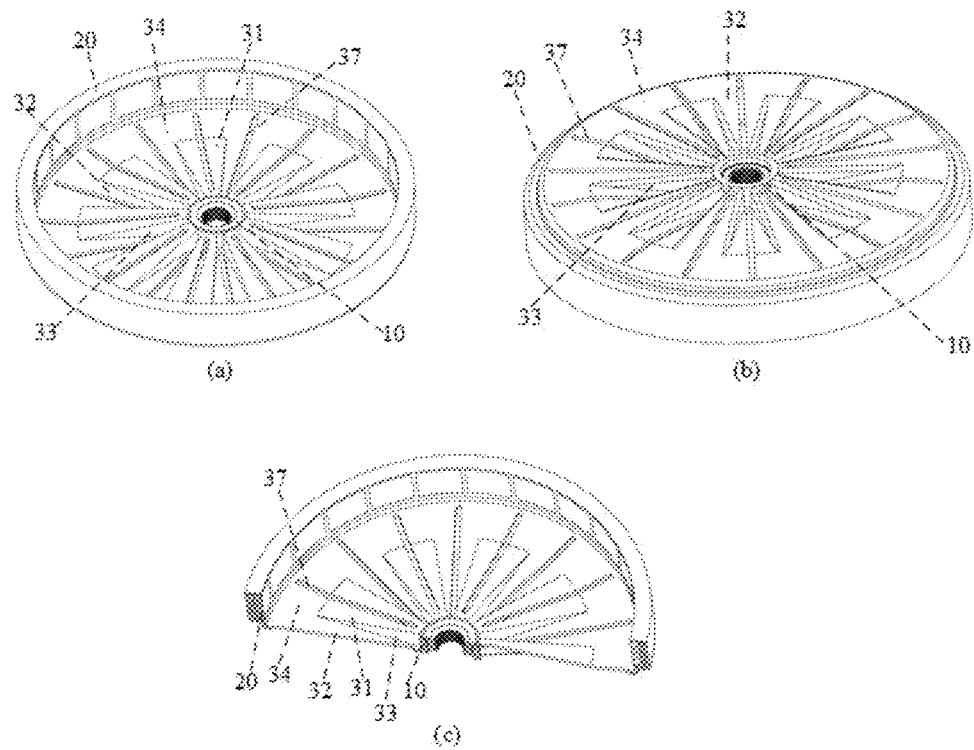
FIG. 10 is a schematic diagram of a further example of the motor external rotor in the embodiments of the present disclosure.

FIG. 10 is a schematic diagram of a further example of the motor external rotor in the embodiments of the present disclosure, (a), (b) and (c) therein show different angles of the motor external rotor, for example being different from the example of FIG. 2, in the example of FIG. 10, a through-hole 37 extending radially is formed on the first web section 31 and the second web section 32, and the through-hole 37 radially extends to the annular section 34.

By providing the through-hole 37, a role of heat dissipation can be played, the through-hole 37 can also be referred to as a heat dissipation hole.

In some embodiments, as shown in FIG. 10, the through-hole 37 extends from a position of the first web section 31 and/or the second web section 32 close to the first inner cylinder portion 10 in a direction away from the first inner cylinder portion 10, and extends to a position of the annular section 34 close to the outer cylinder portion 20. Thereby, it helps formation of the through-hole 37.

FIG. 10 takes forming the through-hole 37 in the first web section 31, the second web section 32 and the annular section 34 as an example, but the present disclosure is not limited to this, the through-hole 37 can also be only formed in the first web section 31, or only formed in the second web section 32, or only formed in the annular section 34, or formed on any combination of the first web section 31, the second web section 32 and the annular section 34.

FIG. 10 takes the through-hole 37 being a long through-hole as an example, but the present disclosure is not limited to this, the through-hole 37 can also be a circular through-hole, or a through-hole in other shape.

Figure 11:
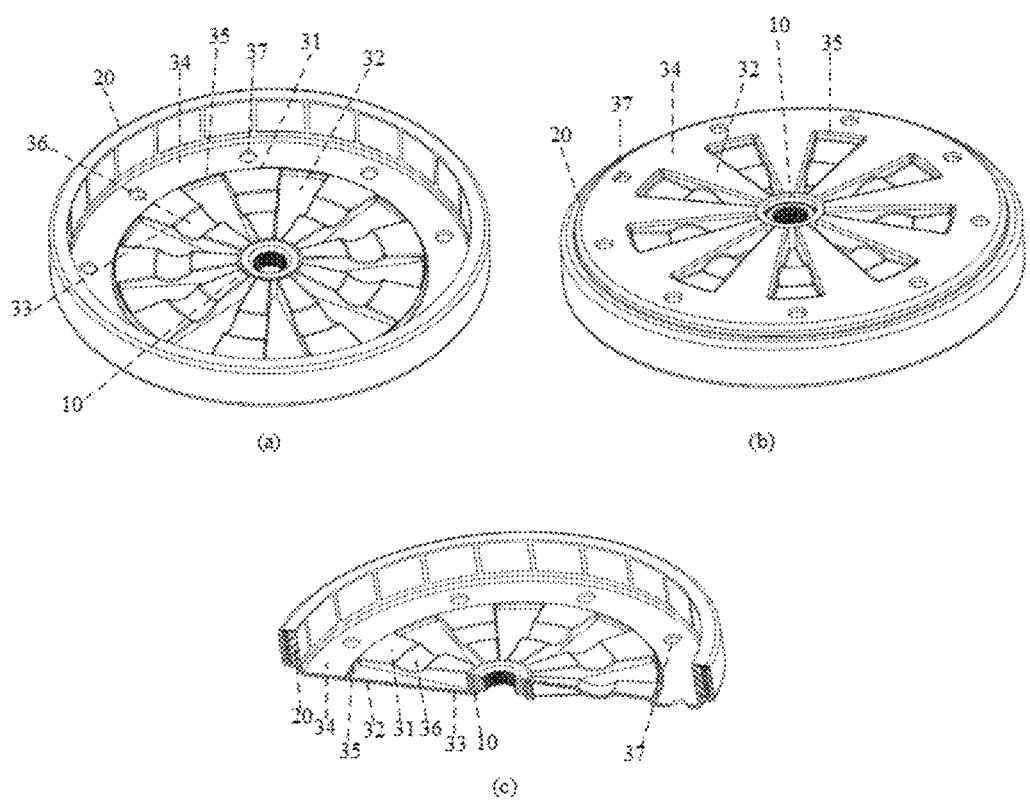
FIG. 11 is a schematic diagram of a more example of the motor external rotor in the embodiments of the present disclosure.

FIG. 11 is a schematic diagram of a more example of the motor external rotor in the embodiments of the present disclosure, (a), (b) and (c) therein show different angles of the motor external rotor. Being different from the example of FIG. 9, in the example of FIG. 11, the connection portion 30 further includes the cylindrical surface ring 35 and the through-hole 37 in addition to the first web section 31, the second web section 32, the axial connection section 33, the annular section 34 and the recess 36. In the example of FIG. 11, the through-hole 37 is a circular through-hole and is formed in the annular section 34.

FIG. 11 takes forming the circular through-hole 37 in the annular section 34 as an example, but the present disclosure is not limited to this, the circular through-hole 37 can also be only formed in the first web section 32, or only formed in the second web section 32, or formed on any combination of the first web section 31, the second web section 32 and the annular section 34.

Figure 12:
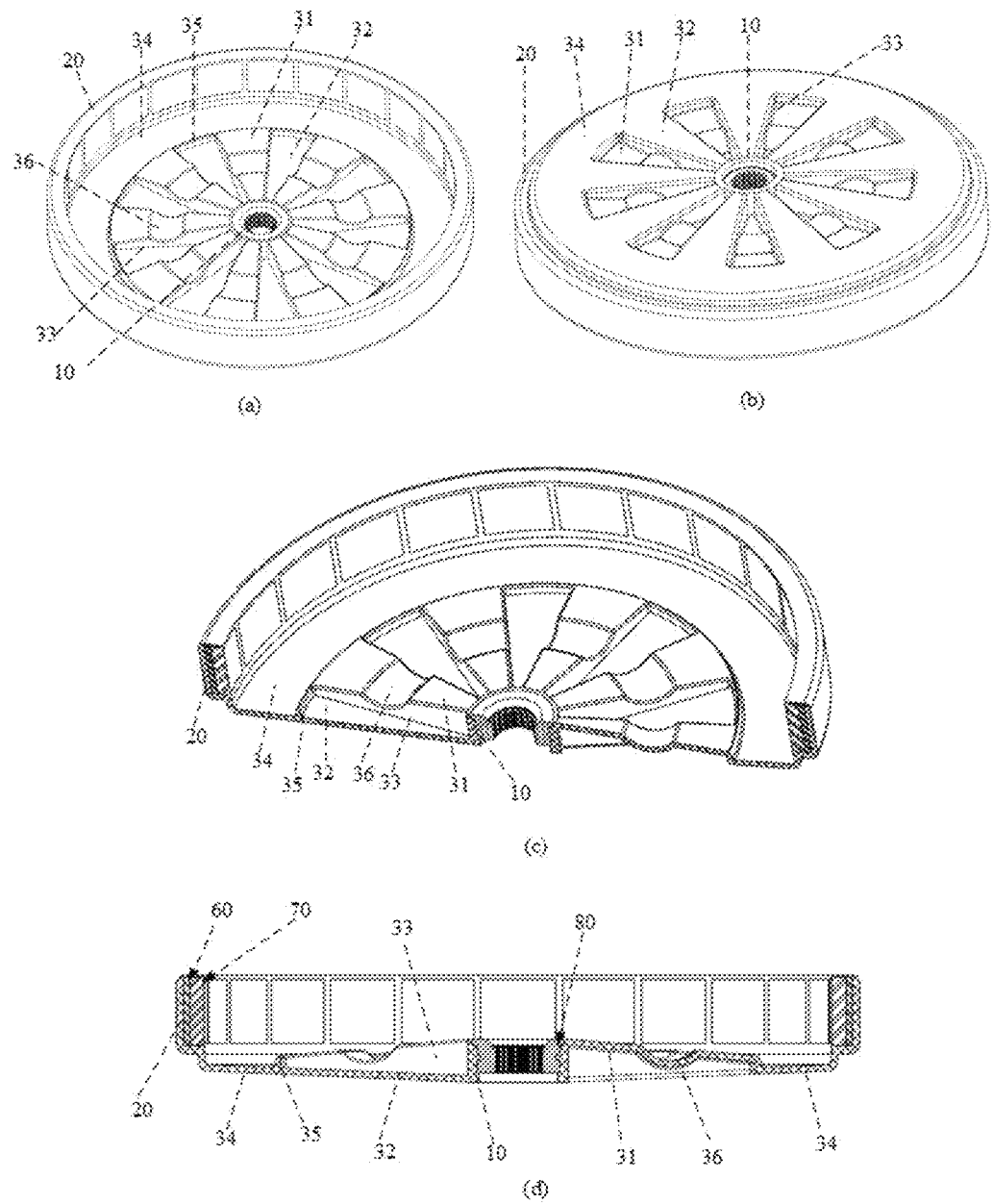
FIG. 12 is a schematic diagram of another example of the motor external rotor in the embodiments of the present disclosure.

FIG. 12 is a schematic diagram of another example of the motor external rotor in the embodiments of the present disclosure, (a), (b), (c) and (d) therein show different angles of the motor external rotor. Being different from the example of FIG. 11, in the example of FIG. 12, the connection portion 30 includes the first web section 31, the second web section 32, the axial connection section 33, the annular section 34, the cylindrical surface ring 35 and the recess 36, but does not include the above-mentioned through-hole 37.

Moreover, as shown in (d) of FIG. 12, the motor external rotor may further include a magnetic conductive ring 60, a magnetic steel 70, and a splined hub 80 which cooperates with the first inner cylinder portion 10. The present disclosure does not make limitations on configuring modes of the magnetic conductive ring 60, the magnetic steel 70 and the splined hub 80, they can be set as shown in (d) of FIG. 12, or there can be other configuring modes, for example the splined hub 80 can be integral with the first inner cylinder portion 10, etc., the description is omitted here.

In the embodiments of the present disclosure, in some embodiments, as shown in FIGS. 1-5 and FIGS. 9-12, the first web section 31 and the second web section 32 are respectively formed to be in a fan shape. Thereby, it helps heat dissipation.

In some embodiments, the axial connection section 33 is formed to be in a curved surface shape, i.e., as observed from a side, the axial connection section 33 is a cambered surface, thereby helping air flowing.

In some embodiments, the axial connection section 33 is formed to be in a straight surface shape, i.e., the axial connection section 33 is a plane, and the axial connection section 33 vertically intersects with the first web section 31 and/or the second web section 32 or obliquely intersects with the first web section 31 and/or the second web section 32 at an obtuse angle or intersects with the first web section 31 and/or the second web section 32 via arc transition, etc. The present disclosure does not make limitations on a connecting mode of the axial connection section 33, the first web section 31 and/or the second web section 32, FIG. 8 shows several possible modes, but the present disclosure is not limited to these.

In the embodiments of the present disclosure, in some embodiments, as shown in FIGS. 1-5 and FIGS. 9-12, a circumferential width of a radial inner side of the first web section 31 is identical with a circumferential width of a radial inner side of the second web section 32; a circumferential width of a radial outer side of the first web section 31 is identical with a circumferential width of a radial outer side of the second web section 32. Namely, the first web section 31 and the second web section 32 are formed to be in an identical shape.

Through such structure, since the first web section 31 and the second web section 32 are designed to alternate circumferentially, and by designing the two to be in a roughly identical triangular shape, a strength and rigidity of the rotor are enhanced, and running noise of the motor is reduced. Moreover, the present disclosure is not limited to this, the first web section 31 and the second web section 32 can also not be in a roughly identical triangular shape, for example circumferential widths of radial inner sides of the two and circumferential widths of radial outer sides of the two are not identical, which can also enhance a strength and rigidity of the rotor and reduce running noise of the motor.

Each of the above embodiments is only illustrative for the embodiments of the present disclosure, but the present disclosure is not limited to this, appropriate variations can be also made based on the above each embodiment. For example, the above each embodiment can be used separately, or one or more of the above embodiments can be combined.

For example, in the examples of FIG. 1, FIG. 4 and FIG. 5, the recess 36 and/or through-hole 37 can be set, and for details, the description about the recess 36 and/or through-hole 37 in FIGS. 9-12 can be referred to.

For another example, in the examples of FIG. 2 and FIG. 3, the cylindrical surface ring 35 and/or the recess 36 and/or through-hole 37 can be set, and for details, the description about the cylindrical surface ring 35, the recess 36 and/or through-hole 37 in FIG. 4 and FIGS. 9-12 can be referred to.

For another example, in the example of FIG. 9, the cylindrical surface ring 35 and/or through-hole 37 can be set, and for details, the description about the cylindrical surface ring 35 and/or through-hole 37 in FIG. 4 and FIGS. 10-12 can be referred to.

For another example, in the example of FIG. 10, the cylindrical surface ring 35 can be set, and for details, the description about the cylindrical surface ring 35 in FIG. 4 can be referred to.

For another example, in the examples of FIGS. 1-4 and FIGS. 6-12, the second inner cylinder portion 40 can be set, and for details, the description about the second inner cylinder portion 40 in FIG. 5 can be referred to.

In the embodiments of the present disclosure, in some embodiments, the above-mentioned connection portion 30 can be designed by adopting a uniform material thickness.

Thereby through such structure, a radial reinforcement rib for increasing a strength of a rotor and a big aperture on the rotor are canceled, a whole injection molding structure is designed by adopting a uniform material thickness. Through a design of alternating webs at both inner and outer sides, and with a uniform material thickness design, a reasonable draft angle and a fillet radius, the problem of a large stress in a product due to non-uniform shrinkage at the time of injection molding is reduced, product deformations and warpages are reduced, a magnetic steel inner cylindrical surface where a rotor finished product cooperates with a stator tooth has small roundness and total runout, and the concentricity of a center of a splined hub is good, thus an air gap between a motor rotor and a stator motor is very uniform, vibrations and noise when a motor runs are reduced.

It's worth noting that the above FIG. 1 to FIG. 12 are only schematic descriptions of the motor external rotor of the embodiments of the present disclosure, but the present disclosure is not limited to these, and for a specific content of each structure or component, relevant technologies can be referred to; moreover, a structure or component which is not shown in FIG. 1 to FIG. 12 can be added, or one or more structures or components in FIG. 1 to FIG. 12 can be reduced. For a component or element which is not specially indicated in FIG. 1 to FIG. 12, relevant technologies can be referred to, the present disclosure does not make limitations.

The external rotor of the embodiments of the present disclosure has good physical performance, mechanical performance and good structural process performance, completely meets the requirements on large-scale use in household appliances and other fields, and has a wide application prospect.

Embodiments of the Second Aspect

The embodiments of the present disclosure provide a motor external rotor.

In the embodiments of the present disclosure, the motor external rotor includes: an inner cylinder portion, an outer cylinder portion located at a radial outer side of the inner cylinder portion, and a connection portion radially connecting the inner cylinder portion and the outer cylinder portion, the connection portion including:
   a plurality of web sections extending from an axial side of an outer circumferential surface of the inner cylinder portion in a direction away from the inner cylinder portion, the plurality of web sections being arranged circumferentially at intervals; and
   a plurality of axial extension sections extending axially at at least one side of a circumferential direction of each of the web sections.

Figure 13:
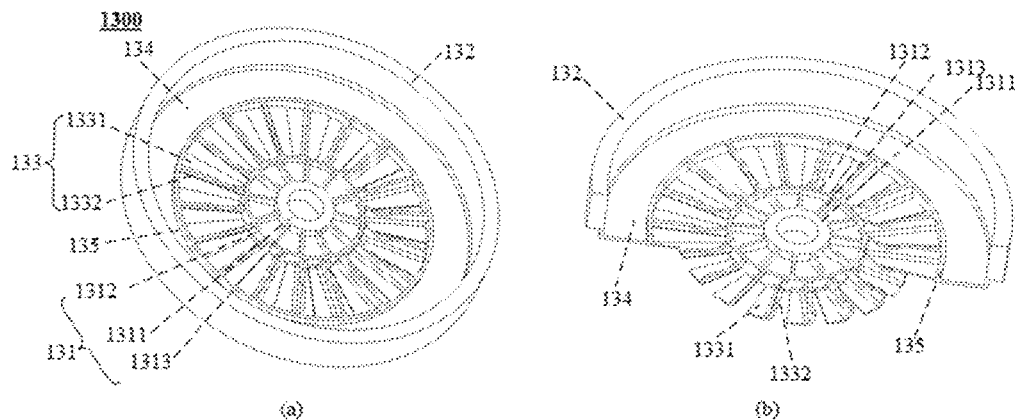
FIG. 13 is a schematic diagram of a more example of the motor external rotor in the embodiments of the present disclosure.

FIG. 13 is a schematic diagram of an example of the motor external rotor in the embodiments of the present disclosure, (a) and (b) therein show the motor external rotor from different angles.

As shown in FIG. 13, the motor external rotor 1300 includes an inner cylinder portion 131, an outer cylinder portion 132 located at a radial outer side of the inner cylinder portion 131, and a connection portion 133 radially connecting the inner cylinder portion 131 and the outer cylinder portion 132.

In the example of FIG. 13, the connection portion 133 includes a plurality of web sections 1331 and a plurality of axial extension sections 1332, the plurality of web sections 1331 extend from an axial side of the outer circumferential surface of the inner cylinder portion 131 in a direction away from the inner cylinder portion 131, and the plurality of web sections 1331 are arranged circumferentially at intervals; the plurality of axial extension sections 1332 extend axially at a circumferential side of each of the web sections 1331.

Figure 14:
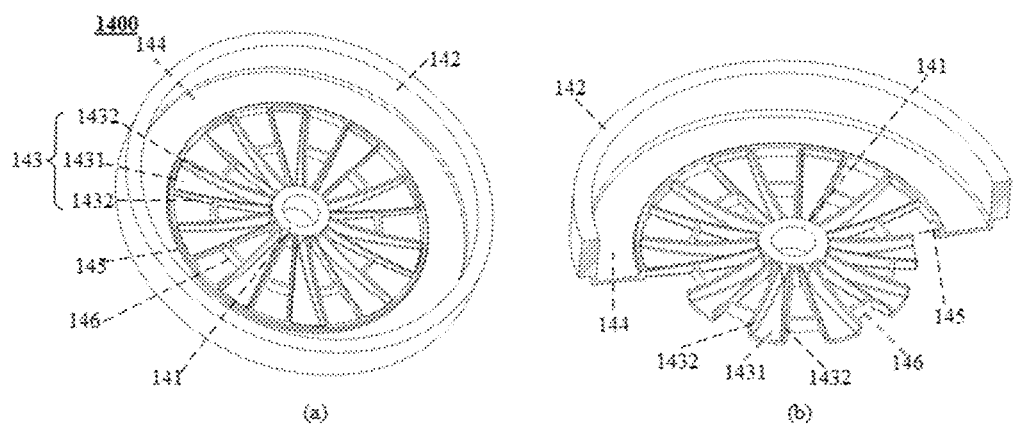
FIG. 14 is a schematic diagram of a more example of the motor external rotor in the embodiments of the present disclosure.

FIG. 14 is a schematic diagram of another example of the motor external rotor in the embodiments of the present disclosure, (a) and (b) therein show the motor external rotor from different angles.

As shown in FIG. 14, the motor external rotor 1400 includes an inner cylinder portion 141, an outer cylinder portion 142 located at a radial outer side of the inner cylinder portion 141, and a connection portion 143 radially connecting the inner cylinder portion 141 and the outer cylinder portion 142.

In the example of FIG. 14, the connection portion 143 includes a plurality of web sections 1431 and a plurality of axial extension sections 1432, the plurality of web sections 1431 extend from an axial side of the outer circumferential surface of the inner cylinder portion 141 in a direction away from the inner cylinder portion 141, and the plurality of web sections 1431 are arranged circumferentially at intervals; the plurality of axial extension sections 1432 extend axially at both circumferential sides of each of the web sections 1431.

Compared to the rotor simultaneously having the first web sections 31 and the second web sections 32 in the embodiments of the first aspect of the present disclosure, the structure of the motor external rotor in FIG. 13 and FIG. 14 saves more usage amount of a raw material and can produce a better heat dissipation effect, the inherent frequency of the rotor will be also changed, thus the problem of noise produced by rotational speed resonance of a whole machine can be improved.

In some embodiments, as shown in FIG. 13 and FIG. 14, it is a fillet angle connection between the axial extension section 1332/1432 and the web section 1331/1431. However, the present disclosure is not limited to this, it can be also a right angle connection or acute angle connection or obtuse angle connection between the two.

In some embodiments, as shown in FIG. 13 and FIG. 14, the motor external rotor 1300/1400 further includes:

an annular section 134/144, located between the outer cylinder portion 132/142 and the connection portion 133/143, and an end of an axial lower side of the outer cylinder portion 132/142 is connected to an edge of a radial outer side of the annular section 134/144.

In some embodiments, as shown in FIG. 13 and FIG. 14, the motor external rotor 1300/1400 further includes:

a cylindrical surface ring 135/145, located between the annular section 134/144 and the connection portion 133/143 and extending axially, ends of the plurality of web sections 133/143 away from a side of the inner cylinder portion 131/141 and ends of the axial extension sections 1332/1432 away from a side of the inner cylinder portion 131/141 are connected an inner circumferential surface of the cylindrical surface ring 135/145.

The structures of the above-mentioned annular section 134/144 and cylindrical surface ring 135/145 are identical with the annular section 34 and the cylindrical surface ring 35 in the embodiments of the first aspect, their contents are combined here, the description is omitted here.

In some embodiments, as shown in FIG. 13, the annular section 134 and the web section 133 are in a planar shape, and the annular section 134 and the web section 133 are located in a same plane.

In some embodiments, as shown in FIG. 14, the annular section 144 is in a planar shape, the web section 143 is in a cambered surface shape or a curved surface shape, a plane where an end of the web section 143 close to a side of the annular section 144 is located, relative to a plane where an end of the web section 143 close to a side of the inner cylinder portion 141 is located, is closer to the other axial side.

In some embodiments, as shown in FIG. 14, one axial extension section 1432 is provided at both sides of the circumference of each of the web sections 143.

In some embodiments, as shown in FIG. 14, the motor external rotor further includes a plurality of circumferential connection sections 146 which circumferentially connect every two adjacent axial extension sections 1432, the plurality of circumferential connection sections 146 are formed to be in an annular shape. In some embodiments, the circumferential connection sections 146 and the web sections 1431 are arranged at intervals. What needs illustration is that although it is not shown, the motor external rotor in FIG. 13 may also include circumferential connection sections 146.

In some embodiments, as shown in FIG. 13, at least part of an axial side of the axial extension section 1332 is recessed toward the other axial side. What needs illustration is that although it is not shown, at least part of an axial side of the axial extension section 1432 in FIG. 14 can also be recessed toward the other axial side.

In some embodiments, as shown in FIG. 13, the inner cylinder portion 131 includes:

a first cylinder section 1311, a second cylinder section 1312, located at a radial outer side of the first cylinder section 1311 and radially opposed to the first cylinder section 1311; and a connection section 1313, radially connecting the first cylinder section 1311 and the second cylinder section 1312;

a plurality of web sections 133 extend from an axial side of an outer circumferential surface of the second cylinder section 1312 in a direction away from the second cylinder section 1312.

What needs illustration is that the inner cylinder portion 141 in FIG. 14 may also have a structure similar to the inner cylinder portion 131 in FIG. 13, the description is omitted here.

It's worth noting that the above FIG. 13 to FIG. 14 are only schematic descriptions of the motor external rotor of the embodiments of the present disclosure, but the present disclosure is not limited to these, and for a specific content of each structure or component, relevant technologies can be referred to; moreover, a structure or component which is not shown in FIG. 13 to FIG. 14 can be added, or one or more structures or components in FIG. 13 to FIG. 14 can be reduced. For a component or element which is not specially indicated in FIG. 13 to FIG. 14, relevant technologies can be referred to, the present disclosure does not make limitations.

The external rotor of the embodiments of the present disclosure has good physical performance, mechanical performance and good structural process performance, completely meets the requirements on large-scale use in household appliances and other fields, and has a wide application prospect.

Embodiments of the Third Aspect

The embodiments of the present disclosure provide a motor external rotor.

In the embodiments of the present disclosure, the motor external rotor includes: a first inner cylinder portion, an outer cylinder portion located at a radial outer side of the first inner cylinder portion, and a connection portion radially connecting the first inner cylinder portion and the outer cylinder portion, the connection portion including:

a plurality of first web sections extending from an axial side of an outer circumferential surface of the first inner cylinder portion in a direction away from the first inner cylinder portion;

a plurality of second web sections extending from the other axial side of the outer circumferential surface of the first inner cylinder portion in a direction away from the first inner cylinder portion, and the plurality of second web sections and the plurality of first web sections being arranged circumferentially at intervals; and a plurality of axial connection sections axially connecting the first web sections and the second web sections, a radial length of each of the axial connection sections being less than a radial length of each of the first web sections and of each of the second web sections.

Figure 15:
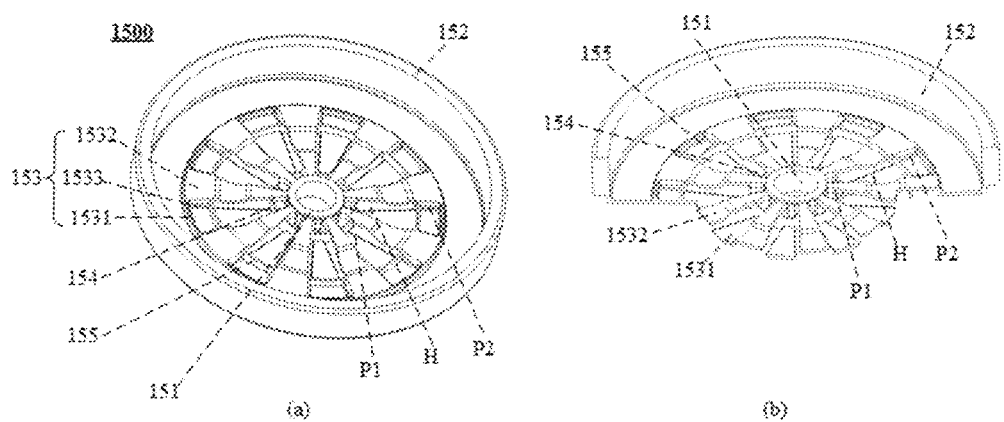
FIG. 15 is a schematic diagram of a more example of the motor external rotor in the embodiments of the present disclosure.

FIG. 15 is a schematic diagram of an example of the motor external rotor in the embodiments of the present disclosure, (a) and (b) therein show the motor external rotor from different angles.

As shown in FIG. 15, the motor external rotor 1500 includes: a first inner cylinder portion 151, an outer cylinder portion 152 located at a radial outer side of the first inner cylinder portion 151, and a connection portion 153 radially connecting the first inner cylinder portion 151 and the outer cylinder portion 152, the connection portion 153 including:

a plurality of first web sections 1531 extending from an axial side of an outer circumferential surface of the first inner cylinder portion 151 in a direction away from the first inner cylinder portion 151;

a plurality of second web sections 1532 extending from the other axial side of the outer circumferential surface of the first inner cylinder portion 151 in a direction away from the first inner cylinder portion 151, and the plurality of second web sections 1532 and the plurality of first web sections 1531 being arranged circumferentially at intervals; and a plurality of axial connection sections 1533 axially connecting the first web sections 1531 the second web sections 1532, a radial length of each of the axial connection sections 1533 being less than a radial length of each of the first web sections 1531 and of each of the second web sections 1532.

The structure of the motor external rotor in FIG. 15 saves more usage amount of a raw material and can produce a better heat dissipation effect, the inherent frequency of the rotor will be also changed, thus the problem of noise produced by rotational speed resonance of a whole machine can be improved.

In the embodiments of the present disclosure, except for the structure of the axial connection sections 1533, other structures are the same as those in the embodiments of the first aspect, and in the embodiments of the present disclosure, only a structure different from the motor external rotor of the embodiments of the first aspect is described.

In some embodiments, FIG. 15 does not show that there is a gap between an end of a radial inner side of each of the axial connection sections 1533 and the first inner cylinder portion 151. Namely, the axial connection section 1533 does not extend starting from an outer circumferential surface of the first inner cylinder portion 151 to a radial outer side, but extends to the radial outer side by being spaced a distance from the first inner cylinder portion 151.

In some embodiments, as shown in FIG. 15, each of the axial connection sections 1533 includes a through-hole H which divides the axial connection section 1533 into two parts, one part (a first part) P1 is close to the first inner cylinder portion 151 and extends from the outer circumferential surface of the first inner cylinder portion 151 to a radial outer side, and the other part (a second part) P2 is away from the first inner cylinder portion 151 and extends to the radial outer side by being across the through-hole H with the first part.

In some embodiments, as shown in FIG. 15, the motor external rotor 1500 further includes: a first annular section 154 and a second annular section 155 which extend axially, the first annular section 154 is arranged around the first inner cylinder portion 151, the second annular section 155 is arranged around the first annular section 154, and an end of a radial inner side of the first part P1 is connected to an outer circumferential surface of the first inner cylinder portion 151, an end of a radial outer side of the first part P1 is connected to the first annular section 154, and an end of a radial inner side of the second part P2 is connected to the second annular section 155.

In some embodiments, as shown in FIG. 15, the motor external rotor 1500 further includes a cylindrical surface ring 35 similar to that in the embodiments of the first aspect, thereby an end of a radial outer side of the second part P2 can be connected to the cylindrical surface ring 35.

In some embodiments, as shown in FIG. 15, it is a fillet angle connection between the axial extension section 1533 and the web section 1531/1532. However, the present disclosure is not limited to this, it can be also a right angle connection or acute angle connection or obtuse angle connection between the two.

It's worth noting that the above FIG. 15 is only a schematic description of the motor external rotor of the embodiments of the present disclosure, but the present disclosure is not limited to this, and for a specific content of each structure or component, relevant technologies can be referred to; moreover, a structure or component which is not shown in FIG. 15 can be added, or one or more structures or components in FIG. 15 can be reduced. For a component or element which is not specially indicated in FIG. 15, relevant technologies can be referred to, the present disclosure does not make limitations.

The external rotor of the embodiments of the present disclosure has good physical performance, mechanical performance and good structural process performance, completely meets the requirements on large-scale use in household appliances and other fields, and has a wide application prospect.

Embodiments of the Fourth Aspect

The embodiments of the present disclosure provide a brushless permanent magnet motor.

Figure 16:
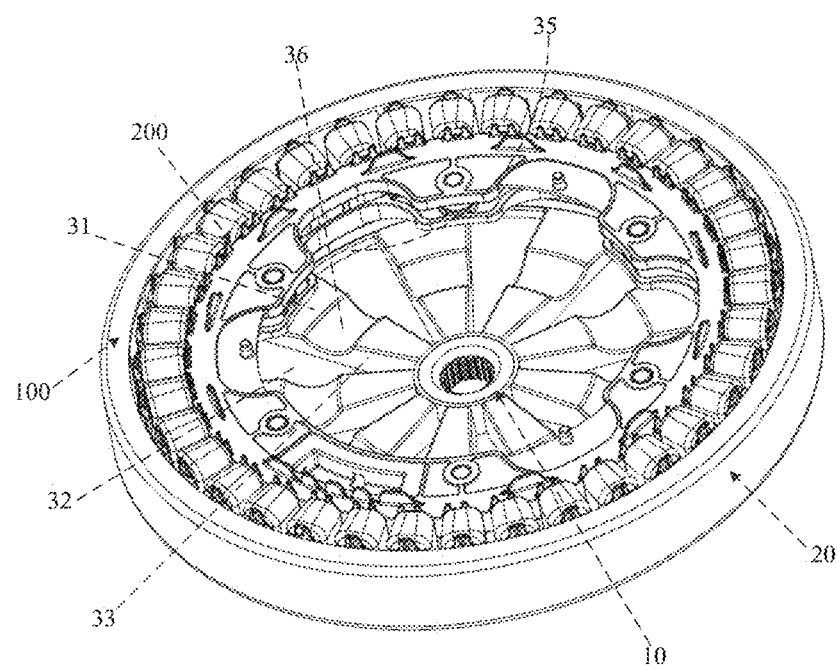
FIG. 16 is a schematic diagram of a brushless permanent magnet motor in the embodiments of the present disclosure.

FIG. 16 is a schematic diagram of a brushless permanent magnet motor in the embodiments of the present disclosure.

As shown in FIG. 16, the brushless permanent magnet motor includes a rotor 100 and a stator 200, the stator 200 is located at a radial inner side of the rotor 100 and configured to be opposed to the rotor 100, the present disclosure does not make limitations on a structure of the stator 200, relevant technologies can be referred to for details, the details will not be described herein again; the rotor 100 is the motor external rotor in the embodiments of the first aspect, and since a structure of the motor external rotor has been described in detail in the embodiments of the first aspect, the details will not be described herein again.

It's worth noting that the above FIG. 16 is only a schematic description of the motor of the embodiments of the present disclosure, but the present disclosure is not limited to this, and for a specific content of each structure or component, relevant technologies can be referred to; moreover, a structure or component which is not shown in FIG. 12 can be added, or one or more structures or components in FIG. 16 can be reduced. For a component or element which is not specially indicated in FIG. 16, relevant technologies can be referred to, the present disclosure does not make limitations.

The motor in the embodiments of the present disclosure adopts the external rotor in the embodiments of the first aspect, has good physical performance, mechanical performance and good structural process performance, completely meets the requirements on large-scale use in household appliances and other fields, and has a wide application prospect.

Embodiments of the Fifth Aspect

The embodiments of the fifth aspect of the present disclosure provide an electrical product. The electrical product includes the motor described in the embodiments of the second aspect, the motor including the external rotor in the embodiments of the first aspect, a structure of the external rotor is simple, magnetic steel positioning distribution is reasonable, a strength and rigidity of the rotor are high, which improve an utilization rate of a material, effectively reduce an internal stress and a deformed warpage caused by rotor injection molding and improve product quality of the rotor; an air gap of a stator and a rotor of a motor is uniform, which effectively reduces running noise of the motor.

In the embodiments of the present disclosure, the electrical product may be any electrical product containing a motor, such as a washing machine, a cleaner (sweeper), a refrigerator (compressor), an air conditioner (indoor machine, outdoor machine), a blower, a mixer, an oxygen increasing pump, and a vehicle-mounted product such as a power-assisted steering system, etc, Or, the above-mentioned motor can be also used as a motor in various information devices and industrial devices, etc.

The present disclosure has been described herein above with reference to the specific implementations, however persons skilled in the art should clearly know that these descriptions are exemplary and do not limit the protection scope of the present disclosure. Persons skilled in the art can make various variations and modifications to the present disclosure based on the principle of the present disclosure, these variations and modifications are also within the scope of the present disclosure.

The invention claimed is:

1. A motor external rotor, comprising: a first inner cylinder portion, an outer cylinder portion located at a radial outer side of the first inner cylinder portion, and a connection portion radially connecting the first inner cylinder portion and the outer cylinder portion, characterized in that the connection portion comprises:
   a plurality of first web sections extending from one axial side of an outer circumferential surface of the first inner cylinder portion in a direction away from the first inner cylinder portion;
   a plurality of second web sections extending from the other axial side of the outer circumferential surface of the first inner cylinder portion in a direction away from the first inner cylinder portion, the plurality of second web sections and the plurality of first web sections being arranged circumferentially at intervals; and
   a plurality of axial connection sections extending from the outer circumferential surface of the first inner cylinder portion in a direction away from the first inner cylinder portion, and axially connecting the first web sections and the second web sections.

2. The motor external rotor according to claim 1, characterized in that the connection portion further comprises:
   an annular section, located at a side of the plurality of first web sections and the plurality of second web sections away from the first inner cylinder portion, and an end of an axial lower side of the outer cylinder portion being connected to an edge of a radial outer side of the annular section.

3. The motor external rotor according to claim 2, characterized in that the connection portion further comprises:
   a cylindrical surface ring, radially located between the annular section and the plurality of second web sections, ends of the plurality of first web sections away from the first inner cylinder portion and ends of the axial connection sections away from the first inner cylinder portion being connected at an inner circumferential surface of the cylindrical surface ring.

4. The motor external rotor according to claim 1, characterized in that a recess concaved toward an axial lower side is formed on an axial upper side of each of the first web sections, a surface of the recess being formed as a curved surface.

5. The motor external rotor according to claim 1, characterized in that the motor external rotor further comprises:
   a second inner cylinder portion, located at a radial inner side of the first inner cylinder portion; and
   a radial connection section, radially connecting the first inner cylinder portion and the second inner cylinder portion.

6. The motor external rotor according to claim 1, characterized in that the plurality of first web sections, the plurality of second web sections and the plurality of axial connection sections are circumferentially formed to be in a wave shape or a fold line shape.

7. The motor external rotor according to claim 1, characterized in that each of the first web sections and each of the second web sections are respectively formed to be in a fan shape.

8. The motor external rotor according to claim 7, characterized in that each of the axial connection sections is formed to be in a curved surface shape.

9. The motor external rotor according to claim 7, characterized in that the axial connection sections is formed as a plane, and the axial connection sections vertically intersect with the first web sections and/or the second web sections or obliquely intersect with the first web sections and/or the second web sections at an obtuse angle.

10. The motor external rotor according to claim 7, characterized in that a circumferential width of a radial inner side of the first web section is identical with a circumferential width of a radial inner side of the second web section, and a circumferential width of a radial outer side of the first web section is identical with a circumferential width of a radial outer side of the second web section.

11. The motor external rotor according to claim 2, characterized in that a through-hole is provided on the annular section and/or each of the axial connection sections and/or each of the first web sections and/or each of the second web sections.

12. The motor external rotor according to claim 11, characterized in that the through-hole extends from a position of the first web section and/or the second web section close to the first inner cylinder portion in a direction away from the first inner cylinder portion to a position of the annular section close to the outer cylinder portion.

13. A motor external rotor, comprising: an inner cylinder portion, an outer cylinder portion located at a radial outer side of the inner cylinder portion, and a first connection portion radially connected the inner cylinder portion and the outer cylinder portion, characterized in that the first connection portion comprises:
   a plurality of web sections extending from one axial side of an outer circumferential surface of the inner cylinder portion in a direction away from the inner cylinder portion, the plurality of web sections being arranged circumferentially at intervals; and
   a plurality of axial extension sections extending axially at at least one side of a circumferential direction of each of the web sections.

14. The motor external rotor according to claim 13, characterized in that each of the axial extension section and each of the web section are connected at a right angle, acute angles, obtuse angles, or fillet angles.

15. The motor external rotor according to claim 13, characterized in that the motor external rotor further comprises:
   an annular section, located between the outer cylinder portion and the first connection portion, an end of an axial lower side of the outer cylinder portion being connected to an edge of a radial outer side of the annular section.

16. The motor external rotor according to claim 15, characterized in that the motor external rotor further comprises:
a cylindrical surface ring, located between the annular section and the first connection portion and extending axially, ends of the plurality of web sections away from the inner cylinder portion and ends of the axial extension sections away from the inner cylinder portion being connected at an inner circumferential surface of the cylindrical surface ring.

17. The motor external rotor according to claim 15, characterized in that the annular section and each of the web sections are in a planar shape, and the annular section and the web sections are located in a same plane.

18. The motor external rotor according to claim 15, characterized in that the annular section is in a planar shape, each of the web sections is in a cambered surface shape or a curved surface shape, and a plane where ends of the web sections close to the annular section is located, relative to a plane where ends of the web sections close to the inner cylinder portion is located, is closer to the other axial side.

19. The motor external rotor according to claim 18, characterized in that one axial extension section is provided at both sides of the circumferential direction of each of the web sections.

20. The motor external rotor according to claim 19, characterized in that the motor external rotor further comprises a plurality of circumferential connection sections which circumferentially connect every two adjacent axial extension sections, the plurality of circumferential connection sections being formed to be in an annular shape.

21. The motor external rotor according to claim 13, characterized in that at least part of one axial side of the axial extension section is recessed toward the other axial side.

22. The motor external rotor according to claim 13, characterized in that the inner cylinder portion comprises:
a first cylinder section, a second cylinder section, located at a radial outer side of the first cylinder section and radially opposed to the first cylinder section; and
a second connection section, radially connecting the first cylinder section and the second cylinder section;
the plurality of web sections extending from one axial side of an outer circumferential surface of the second cylinder section in a direction away from the second cylinder section.

23. A motor external rotor, comprising: a first inner cylinder portion, an outer cylinder portion located at a radial outer side of the first inner cylinder portion, and a connection portion radially connecting the first inner cylinder portion and the outer cylinder portion, characterized in that the connection portion comprises:
a plurality of first web sections extending from one axial side of an outer circumferential surface of the first inner cylinder portion in a direction away from the first inner cylinder portion;
a plurality of second web sections extending from the other axial side of the outer circumferential surface of the first inner cylinder portion in a direction away from the first inner cylinder portion, the plurality of second web sections and the plurality of first web sections being arranged circumferentially at intervals; and
a plurality of axial connection sections axially connecting the first web sections and the second web sections, a radial length of each of the axial connection sections being less than a radial length of each of the first web sections or a radial length of each of the second web sections.

24. The motor external rotor according to claim 23, characterized in that there is a gap between an end of a radial inner side of each of the axial connection sections and the first inner cylinder portion.

25. The motor external rotor according to claim 23, characterized in that each of the axial connection sections comprises a through-hole which divides the axial connection section into a first part close to the first inner cylinder portion and a second part away from the first inner cylinder portion.

26. The motor external rotor according to claim 25, characterized in that the motor external rotor further comprises a first annular section and a second annular section which extend axially, the first annular section being arranged around the first inner cylinder portion and the second annular section being arranged around the first annular section, and an end of a radial inner side of the first part is connected to an outer circumferential surface of the first inner cylinder portion, an end of a radial outer side of the first part is connected to the first annular section, and an end of a radial inner side of the second part is connected to the second annular section.

27. The motor external rotor according to claim 23, characterized in that the axial connection section and the first web sections, and the axial connection section and the second web sections are connected at a right angle, acute angles, obtuse angles, or fillet angles.

* * * * *